United States Patent
Morikawa et al.

(10) Patent No.: US 9,871,652 B2
(45) Date of Patent: Jan. 16, 2018

(54) CRYPTOGRAPHIC PROCESSING METHOD AND CRYPTOGRAPHIC PROCESSING DEVICE

(71) Applicant: FUJITSU LIMITED, Kawasaki-shi, Kanagawa (JP)

(72) Inventors: Ikuya Morikawa, Kawasaki (JP); Masaya Yasuda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/831,179

(22) Filed: Aug. 20, 2015

(65) Prior Publication Data

US 2016/0352510 A1    Dec. 1, 2016

(30) Foreign Application Priority Data

Oct. 10, 2014    (JP) .................................. 2014-209326

(51) Int. Cl.
| | |
|---|---|
| *H04K 1/00* | (2006.01) |
| *H04L 9/00* | (2006.01) |
| *H04L 9/28* | (2006.01) |
| *G09C 1/00* | (2006.01) |

(52) U.S. Cl.
CPC ................ *H04L 9/008* (2013.01); *G09C 1/00* (2013.01)

(58) Field of Classification Search
CPC .................................. H04L 9/008; G09C 1/00
USPC ......................................................... 380/28
See application file for complete search history.

(56) References Cited

U.S. PATENT DOCUMENTS

| | | | |
|---|---|---|---|
| 6,665,405 B1 * | 12/2003 | Lenstra ................. | H04L 9/3013 380/28 |
| 9,614,665 B2 * | 4/2017 | Takenaka ................ | H04L 9/008 |
| 2007/0110232 A1 * | 5/2007 | Akiyama ............... | H04L 9/3026 380/30 |
| 2014/0185794 A1 * | 7/2014 | Yasuda ................... | H04L 9/008 380/28 |

(Continued)

FOREIGN PATENT DOCUMENTS

| | | | | |
|---|---|---|---|---|
| EP | 3007382 | * | 8/2015 | ............... H04L 9/00 |
| EP | 3032775 | * | 11/2015 | ............... H04L 9/00 |
| JP | 2014-126865 | | 7/2014 | |

OTHER PUBLICATIONS

Extended European Search Report dated Feb. 16, 2016 for corresponding European Patent Application No. 15182327.5, 6 pages.

(Continued)

*Primary Examiner* — Dant Shaifer Harriman
(74) *Attorney, Agent, or Firm* — Fujitsu Patent Center

(57) ABSTRACT

A computer generates a third encrypted polynomial that corresponds to a result of encrypting a third polynomial by use of a result of multiplying a first encrypted polynomial by a second encrypted polynomial, and outputs cryptographic information that represents the third encrypted polynomial. The first encrypted polynomial is a polynomial obtained by encrypting a first polynomial that corresponds to a first vector, and the second encrypted polynomial is a polynomial obtained by encrypting a second polynomial that corresponds to a second vector. The third polynomial includes a first term that has a coefficient based on an inner product of the first vector and the second vector and a second term other than the first term, in which a coefficient of the second term is masked.

15 Claims, 14 Drawing Sheets

(56) References Cited

U.S. PATENT DOCUMENTS

| | | | | |
|---|---|---|---|---|
| 2015/0046708 | A1* | 2/2015 | Yasuda | H04L 9/008 713/168 |
| 2015/0280914 | A1* | 10/2015 | Yasuda | H04L 9/14 380/30 |
| 2015/0318991 | A1* | 11/2015 | Yasuda | H04L 9/3093 380/28 |
| 2015/0381348 | A1* | 12/2015 | Takenaka | H04L 9/008 380/30 |
| 2016/0119119 | A1* | 4/2016 | Calapodescu | H04L 9/30 380/30 |
| 2016/0173275 | A1* | 6/2016 | Yasuda | H04L 9/008 380/28 |
| 2016/0269174 | A1* | 9/2016 | Yasuda | H04L 9/008 |
| 2016/0352510 | A1* | 12/2016 | Morikawa | G09C 1/00 |
| 2017/0134158 | A1* | 5/2017 | Pasol | H04L 9/008 |

OTHER PUBLICATIONS

Yasuda, Masaya et al., "Practical Packing Method in Somewhat Homomorphic Encryption", Data Privacy Management and Autonomous Spontaneous Security, Jan. 1, 2014, XP055198854, pp. 34-50, Retrieved from the Internet: URL:http://rd.springer.com/content/pdf/10.1007/978-3-642-54568-9_3.pdf, XP055198854.

Yasuda, Masaya et al., "Packed Homomorphic Encryption Based on Ideal Lattices and Its Application to Biometrics", Sep. 2, 2013, Correct System Design, [Lecture Notes in Computer Science; Lect. Notes Computer], Springer International Publishing, pp. 55-74, XP047037853.

Yasuda, Masaya et al., "Secure Pattern Matching using Somewhat Homomorphic Encryption", Cloud Computin Security Workshop, ACM, Nov. 8, 2013, pp. 65-76, XP058034246.

Craig Gentry, "Fully Homomorphic Encryption Using Ideal Lattices", STOC 2009, May 31-Jun. 2, 2009, pp. 169-178 (10 pages).

Craig Gentry et al., "Implementing Gentry's Fully-Homomorphic Encryption Scheme", Lecture Notes in Computer Science vol. 6632, pp. 1-30, Aug. 5, 2010 (30 pages).

Kristin Lauter et al., "Can Homomorphic Encryption be Practical?", CCSW 2011, pp. 113-124, Oct. 21, 2011 (12 pages).

Masaya Yasuda et al., "A customer information analysis between enterprises using homomorphic encryption", The 12th Forum on Information Technology (FIT 2013), The 4th volume, pp. 15-22, with partial English translation (15 pages).

* cited by examiner

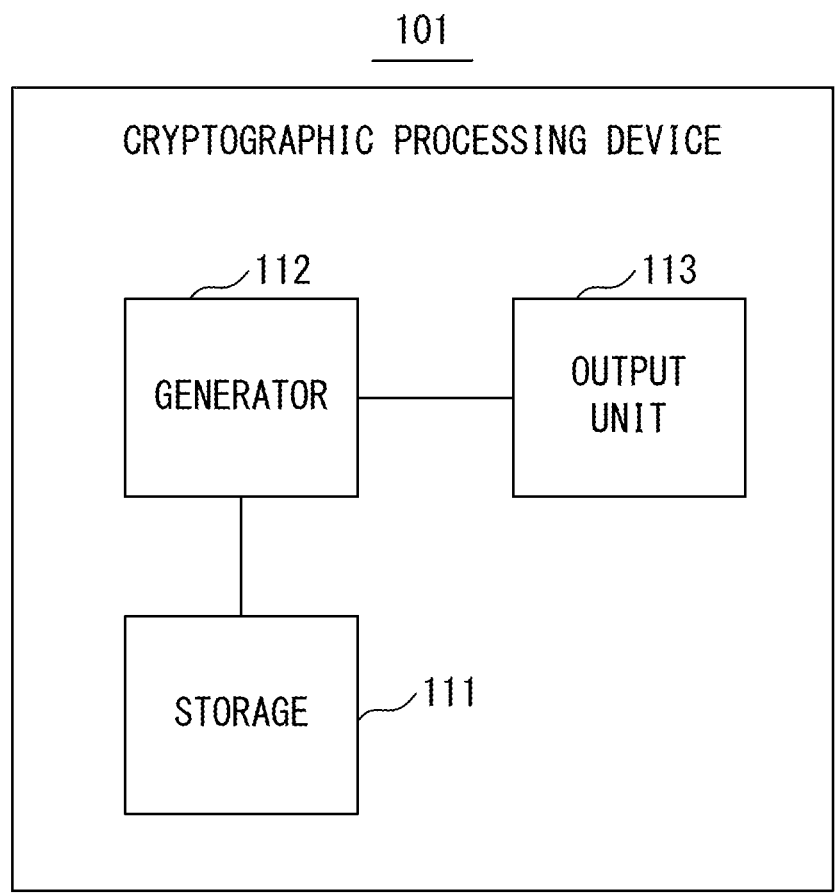
F I G. 1

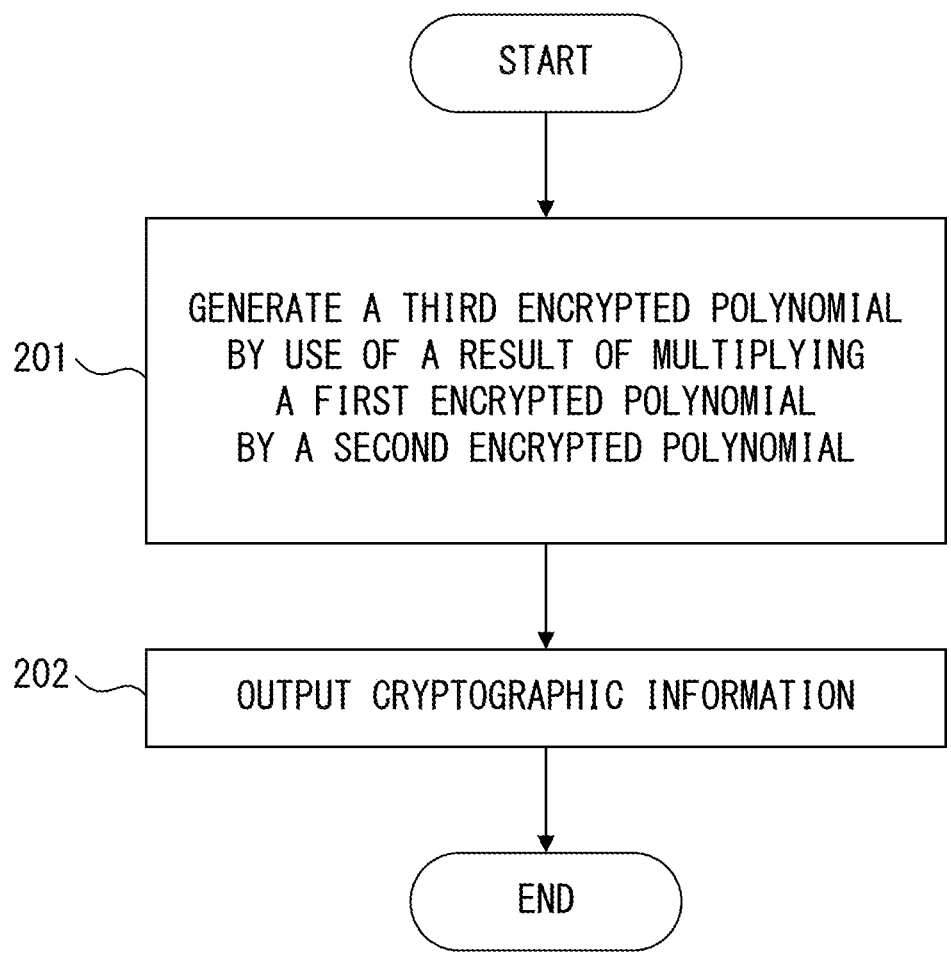
F I G. 2

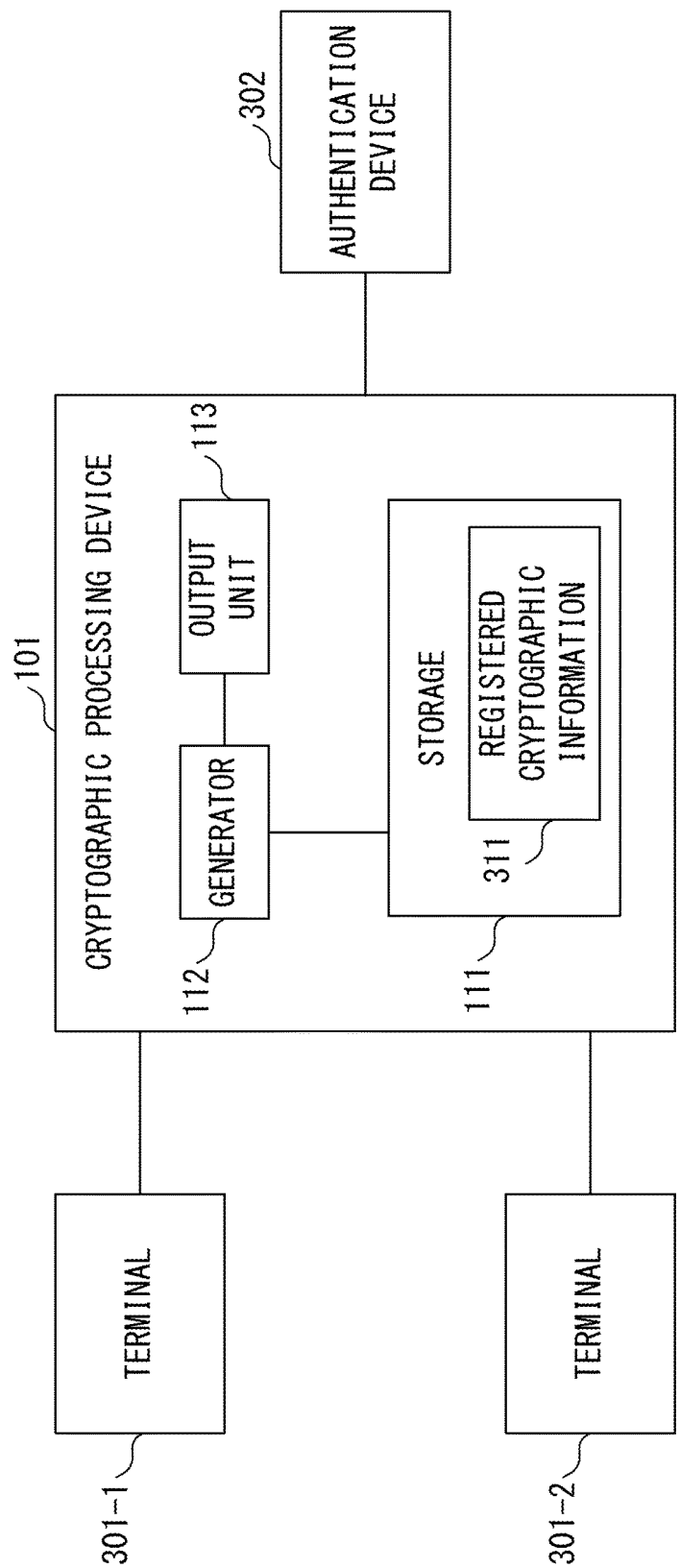
F I G. 3

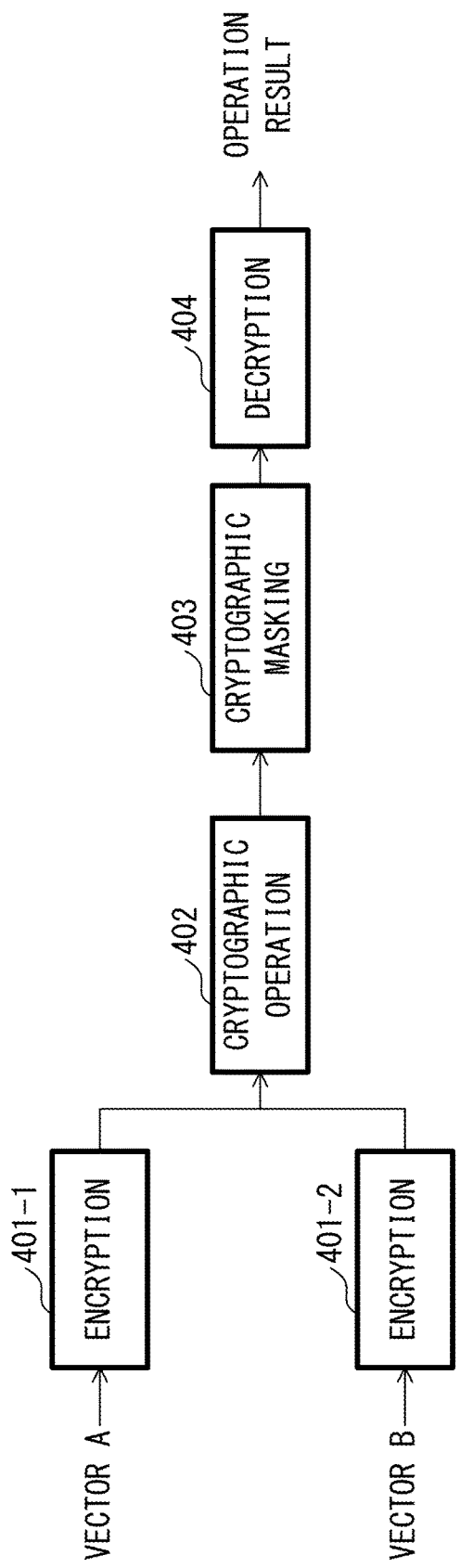
F I G. 4

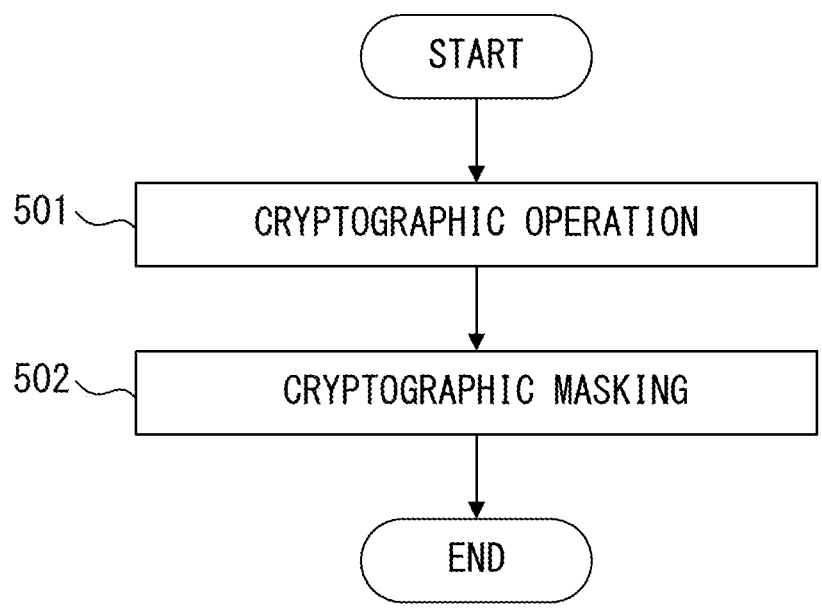
F I G. 5

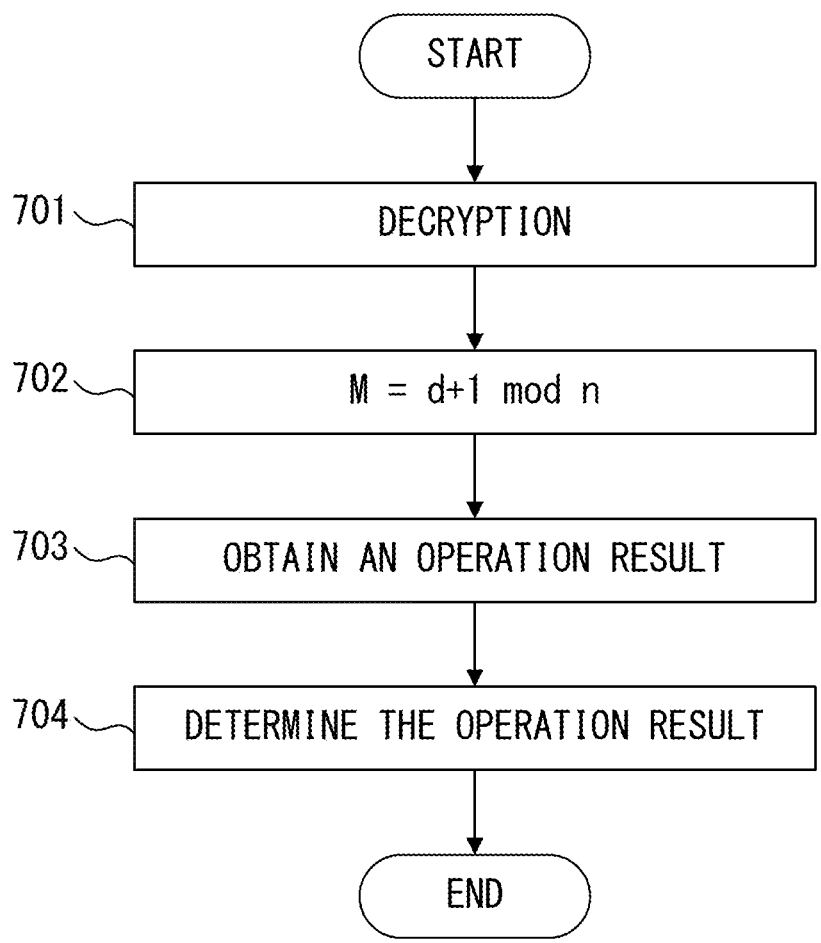
F I G. 7

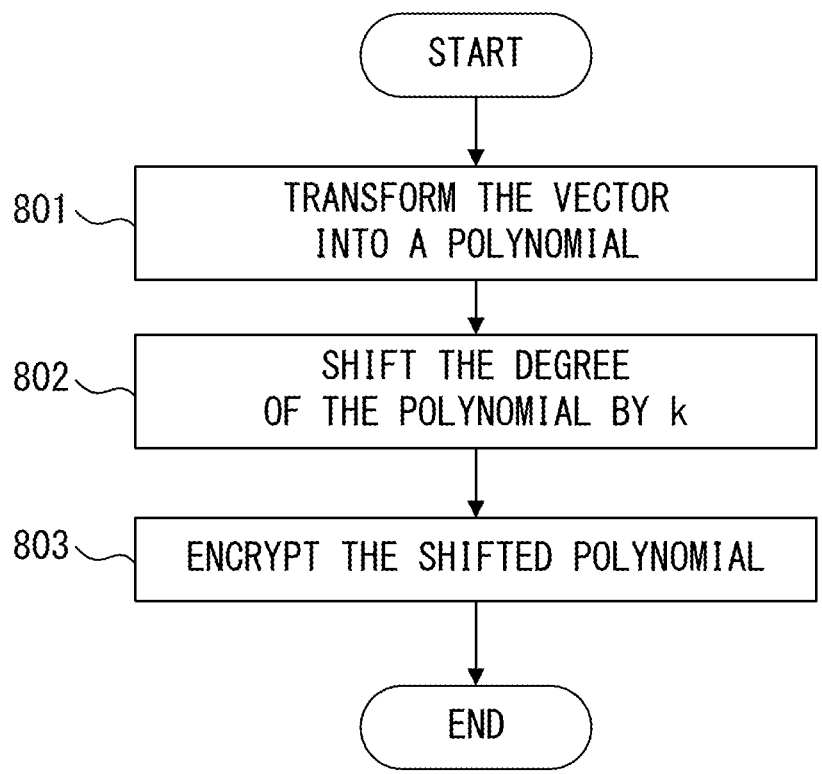
F I G. 8

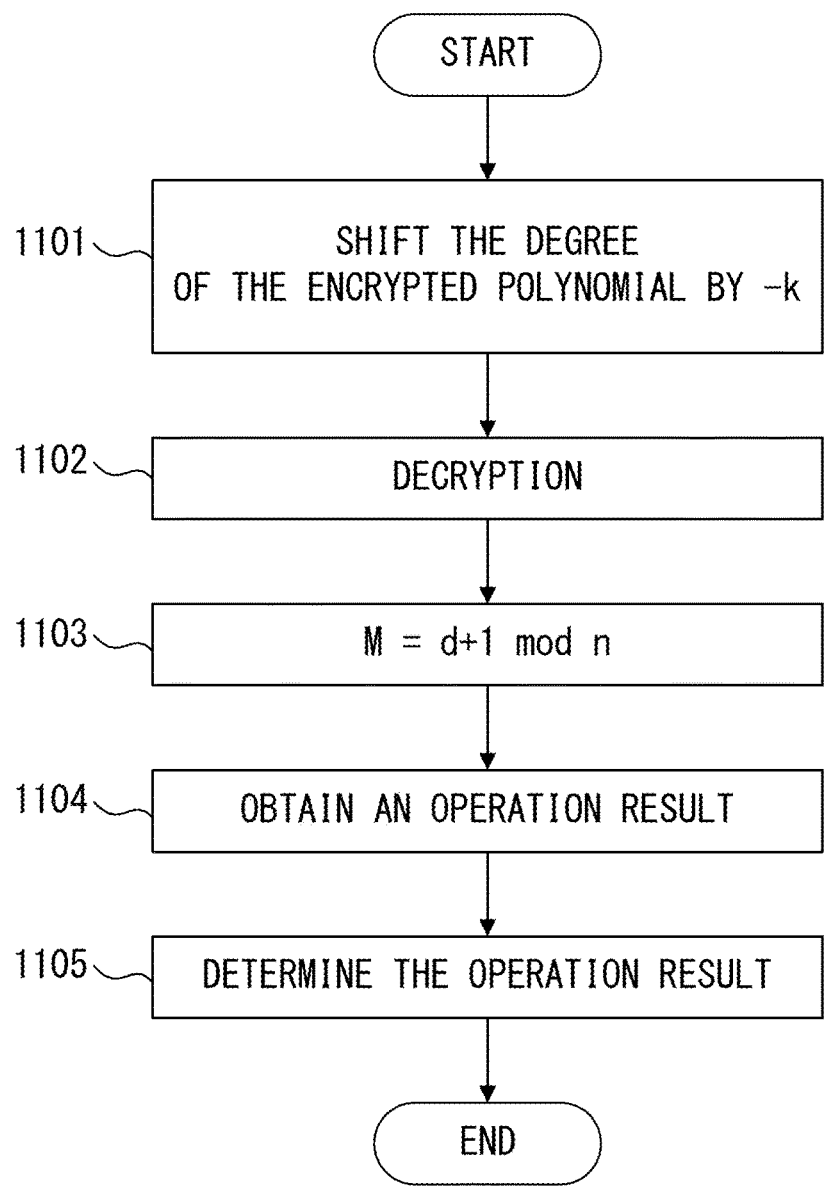
F I G. 1 1

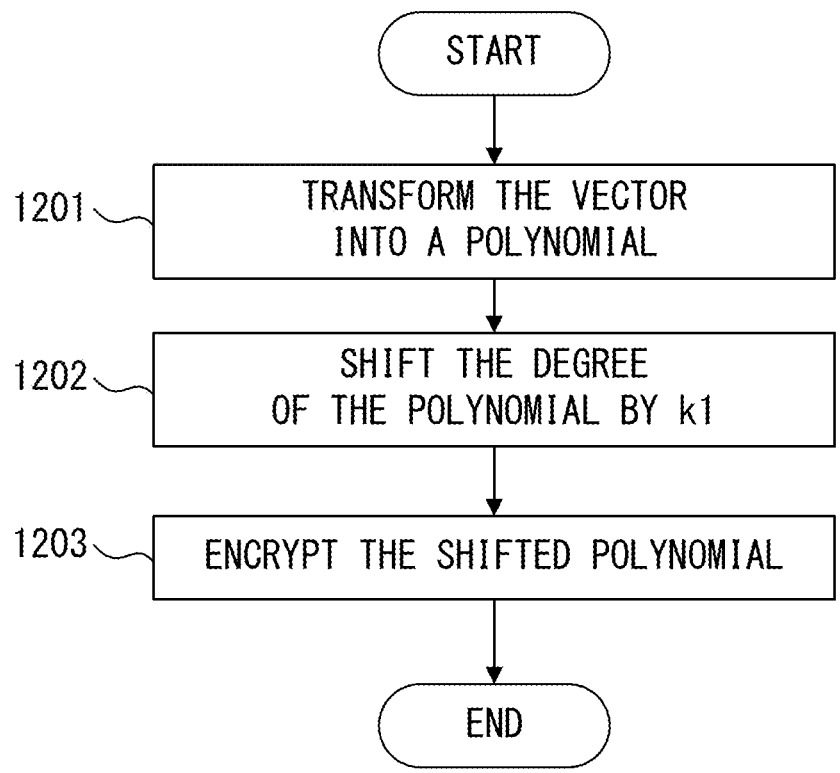
F I G. 1 2

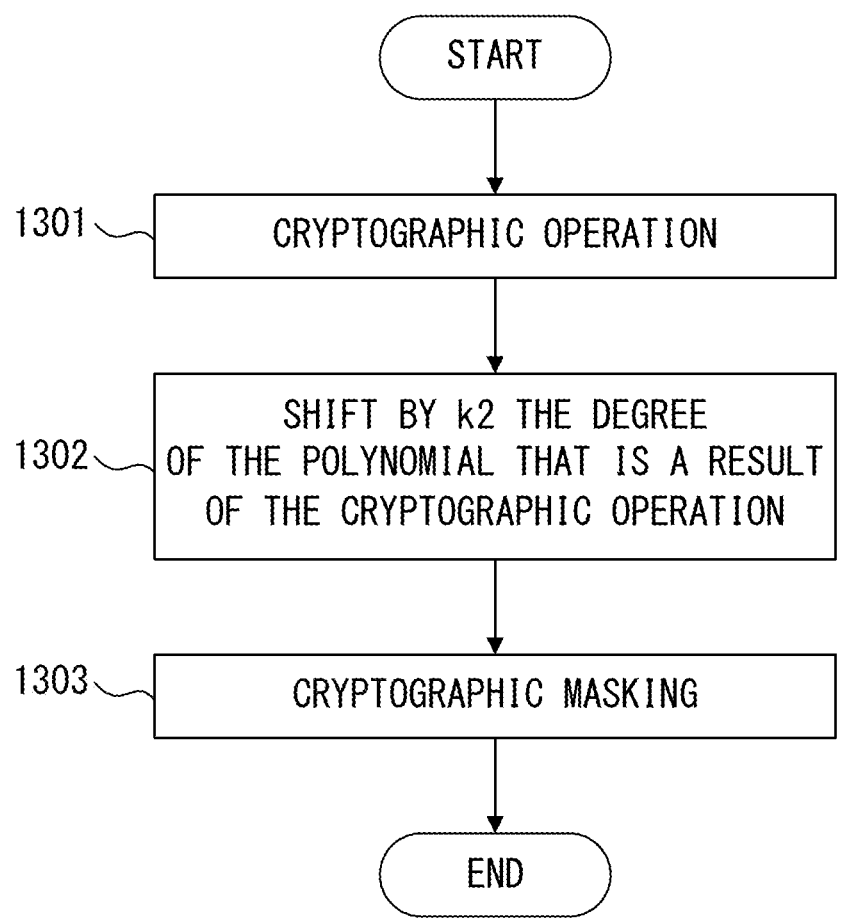
F I G. 1 3

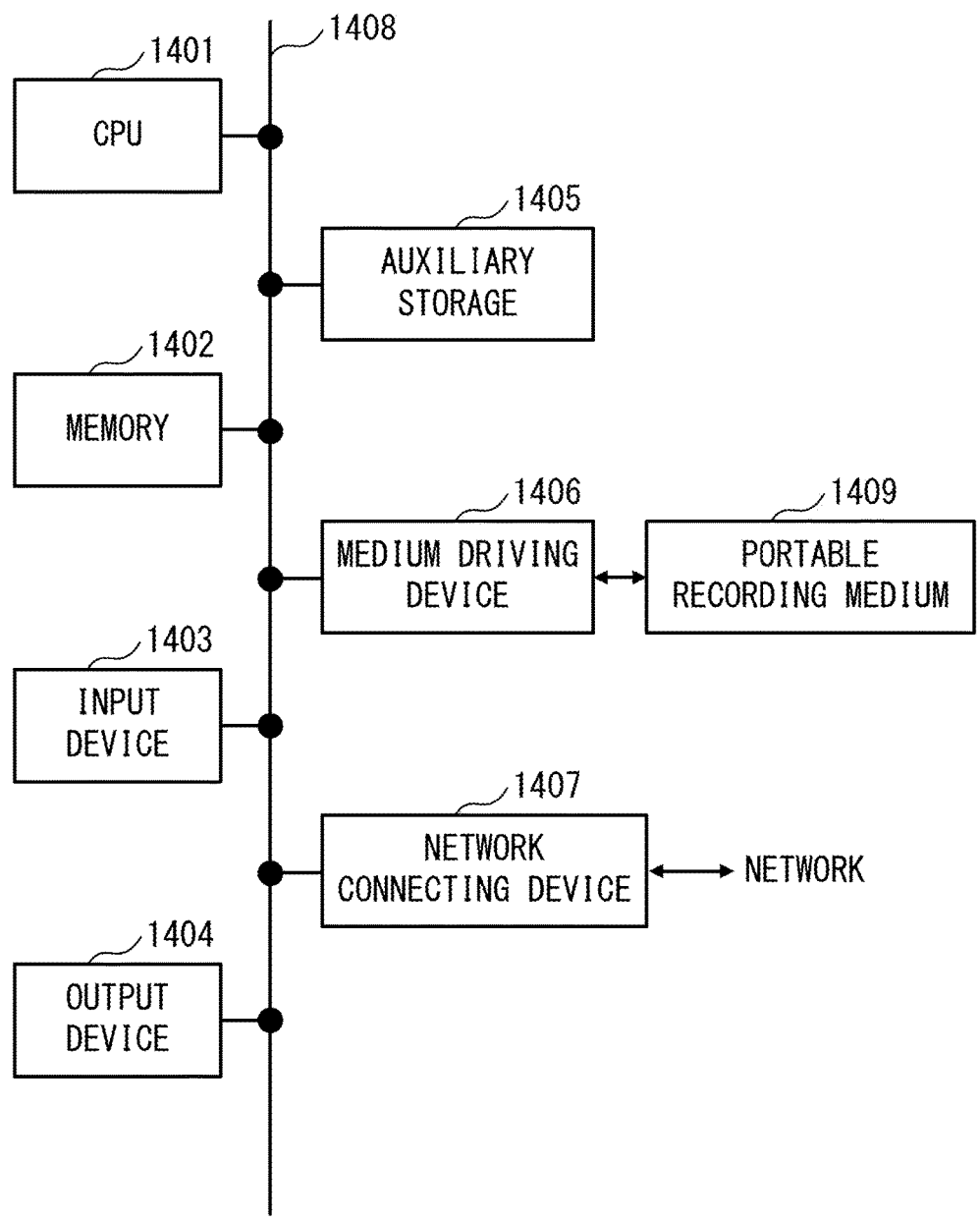
F I G. 1 4

CRYPTOGRAPHIC PROCESSING METHOD AND CRYPTOGRAPHIC PROCESSING DEVICE

CROSS-REFERENCE TO RELATED APPLICATION

This application is based upon and claims the benefit of priority of the prior Japanese Patent Application No. 2014-209326, filed on Oct. 10, 2014, the entire contents of which are incorporated herein by reference.

FIELD

The embodiments discussed herein relate to a cryptographic processing method and a cryptographic processing device.

BACKGROUND

In recent years, data on attributes and behavior of individuals (personal data) and confidential data on organizations such as corporations have become more important with the progress and proliferation of technologies on computers and networks. Performing operations or analysis on personal data or confidential data and using them permits acquiring of an unprecedented new knowledge and realizing of a novel function.

On the other hand, it has been pointed out that there is a risk of invading personal privacy or a secrecy of an organization by using personal data or confidential data. Thus, securing technologies that permit using of personal data or confidential data that remains protected have been attracting attention.

A homomorphic encryption technology is known as a securing technology that uses a cryptographic technology. The homomorphic encryption technology is one of the public key encryption methods in which a pair of different keys is used for encryption and decryption, and has a function that permits a data operation in a state in which the data remains encrypted. According to the homomorphic encryption technology, when performing, on two or more encrypted texts, an operation that corresponds to an addition or multiplication, an encrypted text for a result of an operation of adding or multiplying the original plain texts can be obtained without decrypting the encrypted texts.

As a homomorphic encryption technology, a fully homomorphic encryption scheme has been proposed that permits addition and multiplication to be performed any number of times (see, for example, Non Patent Document 1). The fully homomorphic encryption permits a realization of operations such as Exclusive OR, AND, and NOT, so operations by any logic circuit can be realized without decrypting encrypted texts. However, the fully homomorphic encryption is not practical in terms of performance at present because it takes much processing time for encryption, decryption, and secured operation and a size of cryptographic data becomes large.

Accordingly, a somewhat homomorphic encryption scheme has been proposed that is more practical in terms of performance (see, for example, Non Patent Documents 2 and 3). According to the somewhat homomorphic encryption, more rapid processing can be realized, although there are restrictions such as to the number of multiplications.

For a secured distance calculation using a homomorphic encryption, a cryptographic processing device that permits a reduction in both a size of encrypted vector data and a time for the secured distance calculation is also known (see, for example, Patent Document 1 and Non Patent Document 4). This cryptographic processing device obtains a first polynomial from a first vector by use of a first transform polynomial and a second polynomial from a second vector by use of a second transform polynomial. Then, the cryptographic processing device obtains a first weight that relates to a secured distance of the first vector and a second weight that relates to a secured distance of the second vector.

Next, the cryptographic processing device encrypts each of the first polynomial, the second polynomial, the first weight, and the second weight using a homomorphic encryption, so as to obtain a first encrypted polynomial, a second encrypted polynomial, a first encrypted weight, and a second encrypted weight. Then, the cryptographic processing device obtains an encrypted secured distance that corresponds to an encryption of a secured distance between the first vector and the second vector from the first encrypted polynomial, the second encrypted polynomial, the first encrypted weight, and the second encrypted weight.

Patent Document 1: Japanese Laid-open Patent Publication No. 2014-126865

Non Patent Document 1: C. Gentry, "Fully Homomorphic Encryption Using Ideal Lattices", STOC 2009, pp. 169-178, 2009.

Non Patent Document 2: C. Gentry and S. Halevi, "Implementing Gentry's Fully Homomorphic Encryption Scheme", EUROCRYPT 2011, LNCS 6632, pp. 129-148, 2011.

Non Patent Document 3: K. Lauter, M. Naehrig and V. Vaikuntanathan, "Can Homomorphic Encryption be Practical?", CCSW 2011, pp. 113-124, 2011.

Non Patent Document 4: Yasuda, Shimoyama, Yokoyama and Kogure, "A customer information analysis between enterprises using homomorphic encryption", The 12th Forum on Information Technology (FIT 2013), The 4th volume pp. 15-22, 2013.

SUMMARY

According to an aspect of the embodiments, a computer generates a third encrypted polynomial that corresponds to a result of encrypting a third polynomial by use of a result of multiplying a first encrypted polynomial by a second encrypted polynomial, and outputs cryptographic information that represents the third encrypted polynomial.

The first encrypted polynomial is a polynomial obtained by encrypting a first polynomial that corresponds to a first vector, and the second encrypted polynomial is a polynomial obtained by encrypting a second polynomial that corresponds to a second vector. The third polynomial includes a first term that has a coefficient based on an inner product of the first vector and the second vector and a second term other than the first term, in which a coefficient of the second term is masked.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a functional block diagram of a cryptographic processing device;

FIG. 2 is a flowchart of cryptographic processing;

FIG. 3 is a block diagram of a biometric system;

FIG. 4 is a block diagram of processing performed by the biometric system;

FIG. 5 is a flowchart of a specific example of cryptographic processing;

FIG. 7 is a flowchart of authentication processing;

FIG. 8 is a flowchart of first encryption for shifting a degree;

FIG. 11 is a flowchart of a second example of authentication processing based on a shift operation;

FIG. 12 is a flowchart of second encryption for shifting a degree;

FIG. 13 is a flowchart of cryptographic processing for shifting a degree; and

FIG. 14 is a block diagram of an information processing device.

DESCRIPTION OF EMBODIMENTS

Figure 6:
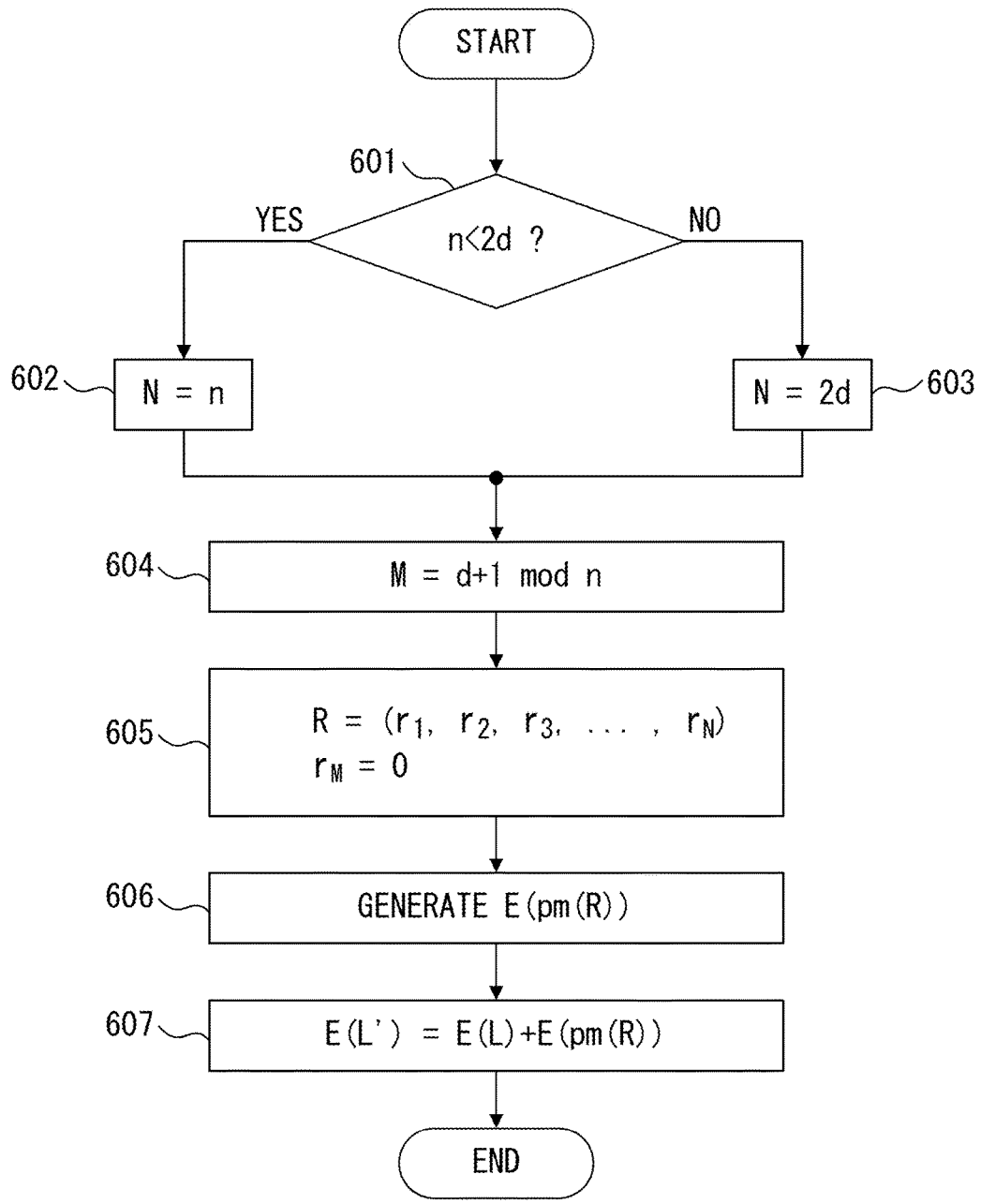
FIG. 6 is a flowchart of cryptographic masking.

Embodiments of the present invention will now be described in detail with reference to the drawings.

Section 3.2 of Non Patent Document 3 discloses a constructing method of a somewhat homomorphic encryption scheme that is an extended version of the somewhat homomorphic encryption scheme disclosed in Non Patent Document 2. According to this method, three key-generating parameters (n, q, t) are mainly used to generate an encryption key. n is an integer that is a power of two, and is referred to as a lattice dimension. q is a prime, and t is an integer that is less than the prime q.

In the process of the encryption key generation, first, a polynomial sk of degree n−1 in which each coefficient is very small is generated as a secret key at random. The value of each coefficient is restricted by a certain parameter σ. Next, a polynomial a1 of degree n−1 in which each coefficient is less than q and a polynomial e of degree n−1 in which each coefficient is very small are generated at random. Then, the following formula for a polynomial a0 is calculated, and a pair of polynomials (a0, a1) is defined as a public key pk.

$$a0 = -(a1*sk + t*e) \quad (1)$$

However, in a calculation of the polynomial a0, a polynomial whose degree is lower than n is always calculated by using "$x^n = -1, x^{n+1} = -x, \ldots$" with respect to a polynomial whose degree is higher than or equal to n. Further, as a coefficient in each term included in a polynomial, a remainder obtained by dividing the coefficient by a prime q is used. A space in which such a polynomial operation is performed is often technically represented as $R_q := F_q[x]/(x^n+1)$.

Next, for plaintext data m that is represented by a polynomial of degree n−1 in which each coefficient is less than t and a public key pk, three polynomials u, f, and g of degree n−1 in which each coefficient is very small are generated at random, and cryptographic data Enc(m,pk) of the plaintext data m is defined by the following formulas:

$$Enc(m,pk) = (c0,c1) \quad (2)$$

$$c0 = a0*u + t*g + m \quad (3)$$

$$c1 = a1*u + t*f \quad (4)$$

The polynomial operation in the space $R_q$ is also used for a calculation of the polynomial c0 and the polynomial c1. In this case, a cryptographic addition for cryptographic data Enc(m1, pk)=(c0, c1) and cryptographic data Enc(m 2, pk)=(d0, d1) is performed by the following formula:

$$Enc(m1,pk) + Enc(m2,pk) = (c0+d0, c1+d1) \quad (5)$$

Further, a cryptographic multiplication for the cryptographic data Enc(m1, pk) and the cryptographic data Enc (m2, pk) is performed by the following formula:

$$Enc(m1,pk)*Enc(m2,pk) = (c0*d0, c0*d1+c1*d0, c1*d1) \quad (6)$$

When performing the cryptographic multiplication by Formula (6), the cryptographic data changes from that of a two-dimensional vector to that of three-dimensional vector. If the cryptographic multiplication is repeated several times, there is a further increase in the elements of the cryptographic data that is a multiplication result.

Next decryption is described. The cryptographic data c=(c0, c1, c2, . . . ) in which the elements have increased as a result of an operation such as a several-times cryptographic multiplication is decrypted by calculating the following formula for a decryption result Dec(c, sk) by use of a secret key sk.

$$Dec(c,sk) = [c0 + c1*sk + c2*sk^2 + \ldots ]_q \bmod t \quad (7)$$

In Formula (7), $[f(x)]_q$ mod t represents a polynomial in which each coefficient $z_i$ in a polynomial f(x) is replaced with $[z_i]_q$ mod t. A value of $[z]_q$ for an integer z is defined by the following formula by use of a remainder w obtained by dividing z by q:

$$[z]_q = w \text{ (in case of } w < q/2) \quad (8)$$

$$[z]_q = w - q \text{ (in case of } w \geq q/2) \quad (9)$$

Thus, the range of values of $[z]_1$ is [−q/2,q/2). Further, a mod t represents a remainder obtained by dividing an integer a by t.

Taking (n,q,t)=(4,1033,20) for example, the following polynomial is a simple example of a secret key sk, a public key pk, and cryptographic data Enc(m,pk):

$$sk = Mod(Mod(4,1033)*x^3 + Mod(4,1033)*x^2 + Mod(1, 1033)*x, x^4+1) \quad (10)$$

$$pk = (a0, a1) \quad (11)$$

$$a0 = Mod(Mod(885,1033)*x^3 + Mod(519,1033)*x^2 + Mod(621,1033)*x + Mod(327,1033), x^4+1) \quad (12)$$

$$a1 = Mod(Mod(661,1033)*x^3 + Mod(625,1033)*x^2 + Mod(861,1033)*x + Mod(311,1033), x^4+1) \quad (13)$$

$$Enc(m,pk) = (c0, c1) \quad (14)$$

$$m = 3 + 2x + 2x^2 + 2x^3 \quad (15)$$

$$c0 = Mod(Mod(822,1033)*x^3 + Mod(1016,1033)*x^2 + Mod(292,1033)*x + Mod(243,1033), x^4+1) \quad (16)$$

$$c1 = Mod(Mod(840,1033)*x^3 + Mod(275,1033)*x^2 + Mod(628,1033)*x + Mod(911,1033), x^4+1) \quad (17)$$

In Formulas (10) to (17), Mod(a,q) represents a remainder obtained by dividing an integer a by a prime q, and Mod(f (x),$x^4$+1) represents a remainder (polynomial) obtained by dividing a polynomial f(x) by a polynomial $x^4$+1. For example, Mod(f(x),$x^4$+1) for f(x)=$x^4$ is equal to Mod(f(x), $x^4$+1) for f(x)=−1, and Mod(f(x),$x^4$+1) for f(x)=$x^5$ is equal to Mod(f(x),$x^4$+1) for f(x)=−x.

The above-mentioned somewhat homomorphic encryption scheme is superior to a fully homomorphic encryption scheme in terms of performance, but it does not have satisfactory performance for practical purposes because, still, it takes much processing time and a size of cryptographic data becomes large when processing vector data (a plurality of strings of data) at one time.

For the above problem, a cryptographic processing device of Patent Document 1 permits a great improvement in processing time and a size of cryptographic data by performing a polynomial transformation to represent the vector data as one polynomial and encrypting the polynomial by a homomorphic encryption.

In this cryptographic processing device, for example, the following two d-dimensional vectors are used as input data:

$$A=(a_1, a_2, a_3, \ldots, a_d) \quad (21)$$

$$B=(b_1, b_2, b_3, \ldots, b_d) \quad (22)$$

The following two types of polynomial transformation, an ascending-order transformation and a descending-order transformation, are used to calculate a distance between two vectors at a high speed in a state in which those two vectors remain encrypted.

[Ascending-Order Transformation]

$$A=(a_1, a_2, a_3, \ldots, a_d) \Rightarrow pm1(A) = a_1 + a_2 x + a_3 x^2 + \ldots + a_d x^{d-1} \quad (23)$$

[Descending-Order Transformation]

$$B=(b_1, b_2, b_3, \ldots, b_d) \Rightarrow pm2(B) = b_1 x^d + b_2 x^{d-1} + \ldots + b_d x \quad (24)$$

When encrypting a polynomial pm1(A) and a polynomial pm2(B) by a homomorphic encryption E, an encrypted polynomial E1(A) and an encrypted polynomial E2(B) are generated.

$$E1(A) = E(pm1(A)) \quad (25)$$

$$E2(B) = E(pm2(B)) \quad (26)$$

Using characteristics of a homomorphic encryption for the encrypted polynomial E1(A) and the encrypted polynomial E2(B), an inner product of a vector A and a vector B can be calculated at a high speed by the following cryptographic multiplication:

$$E(D) = E1(A) * E2(B) \quad (27)$$
$$\quad = E(pm1(A)) * E(pm2(B))$$

A polynomial D which a decryptor having a secret key can obtain by decrypting a multiplication result E (D) of the cryptographic multiplication is equivalent to a polynomial obtained by the multiplication pm1(A)*pm2(B). Thus, an inner product of the vector A and the vector B, $a_1 b_1 + a_2 b_2 + \ldots + a_d b_d$, is obtained from the coefficient in the term $x^d$ included in the polynomial D.

For example, when the vector A and the vector B are binary vectors, all the elements $a_1$ to $a_d$ of the vector A are 0 or 1, and all the elements $b_1$ to $b_d$ of the vector B are 0 or 1. In this case, using characteristics of the cryptographic multiplication performed in Formula (27), a Hamming distance between the vector A and the vector B can be calculated by the following formula in a state in which E1(A) and E2(B) remain homomorphically encrypted:

$$E(D_H) = E1(A)*E2(C) + E1(C)*E2(B) - 2*E1(A)*E2(B) \quad (28)$$

In Formula (28), a vector C is a vector of which all the elements are 1.

$$C=(1,1,\ldots,1) \quad (29)$$

A polynomial $D_H$ obtained by decrypting the encrypted Hamming distance E ($D_H$) is equivalent to a polynomial obtained by calculating the following formula:

$$pm1(A)*pm2(C) + pm1(C)*pm2(B) - 2*pm1(A)*pm2(B) \quad (30)$$

Thus, a Hamming distance HD between the vector A and the vector B is obtained from the coefficient in the term $x^d$ included in the polynomial $D_H$.

$$HD = a_1 + a_2 + \ldots + a_d + b_1 + b_2 + \ldots + b_d - 2(a_1 b_1 + a_2 b_2 + \ldots + a_d b_d) \quad (31)$$

An ideal-lattice-based homomorphic encryption, a ring-Lauter-Naehrig-Vaikuntanathan-based (ring-LWE-based) homomorphic encryption or the like can be used as a homomorphic encryption.

According to these cryptographic operations, a secured calculation to obtain an inner product or a Hamming distance between two vectors can be performed at a higher speed and at a smaller data size. These cryptographic operations are used in, for example, a biometric system for comparing pieces of data acquired from living individuals or a tag-search system for searching from many tags a tag that has certain characteristics.

When it is not a problem if a decryptor who has a secret key is aware of all the elements of the vector A and the vector B, the decryptor may calculate an inner product or a Hamming distance directly using the vector A and the vector B instead of performing a cryptographic operation. However, a security requirement is often imposed such that it is not preferable for a decryptor to know the elements themselves of the vector A and the vector B even though he or she may be aware of the inner product or the Hamming distance of the vector A and the vector B.

Using the cryptographic processing device of Patent Document 1, a decryptor is able to know, by decrypting an encrypted secured distance, not only a secured distance between two vectors but also the information on the elements of each of the vectors that are input data. As a result, the elements of the vectors may be leaked to the decryptor.

In the cryptographic processing device of Patent Document 1, the information on the input data before encryption is left in a result of a cryptographic operation as a by-product of the cryptographic operation. Thus, when decrypting the result of the cryptographic operation, the decryptor is able to know not only a result of an operation of, for example, an inner product or a Hamming distance but also much more information on a relationship between pieces of input data. In this case, the decryptor is able to obtain from the above-mentioned information a part of or all the input data to be secured, which does not meet the security requirement.

For example, the polynomial D that corresponds to the multiplication result E(D) in Formula (27) includes, as a coefficient in the term $x^d$, the inner product of the vector A and the vector B, $a_1 b_1 + a_2 b_2 + \ldots + a_d b_d$, as well as the coefficients in the terms of the other degrees of x. For example, the term $x^0$ (constant term) includes $a_1$, the coefficient in the term $x^1$ includes $a_1 b_d$, and the coefficient in the term $x^2$ includes $a_1 b_{d-1} + a_2 b_{d-2}$. Which value appears in which term is determined according to a lattice dimension n of the space $R_q$ in which a polynomial operation is performed.

The values of these coefficients are derived from the values of each of the elements of the original vectors A and B, and a part of or all the elements of the vectors A and B can be definitely or stochastically derived from these coefficients. As a result, not only the result of the operation to be reported but also the information on the vectors A and B to be secured are leaked to the decryptor who decrypts the result of the cryptographic operation to obtain the result of the operation.

In particular, when the decryptor knows one of the vector A and the vector B, or when the decryptor can intentionally determine one of the vector A and the vector B, there is a significant leakage of information. Further, anyone can prepare cryptographic data on an intentionally created vector because the vector A and the vector B are encrypted by a public key. Thus, it is difficult to prevent the information from being leaked by the protection provided by the encryption.

The above-mentioned problem may occur not only when an encrypted secured distance is decrypted but also when cryptographic information that represents a result of multiplying two encrypted polynomials is decrypted.

FIG. 1 is a functional block diagram of an example of a cryptographic processing device according to an embodiment. The cryptographic processing device 101 includes a storage 111, a generator 112, and an output unit 113. The storage 111 stores therein cryptographic information that represents a first encrypted polynomial obtained by encrypting a first polynomial that corresponds to a first vector. The generator 112 performs cryptographic processing by use of the cryptographic information stored in the storage 111, and the output unit 113 outputs a result of the cryptographic processing.

FIG. 2 is a flowchart of an example of cryptographic processing performed by the cryptographic processing device 101 in FIG. 1. The generator 112 generates a third encrypted polynomial that corresponds to a result of encrypting a third polynomial by use of a result of multiplying the first encrypted polynomial by a second encrypted polynomial (Step 201).

The first encrypted polynomial is a polynomial obtained by encrypting the first polynomial that corresponds to the first vector, and the second encrypted polynomial is a polynomial obtained by encrypting a second polynomial that corresponds to a second vector. The third polynomial includes a first term that has a coefficient based on an inner product of the first vector and the second vector and a second term other than the first term, in which a coefficient of the second term is masked. The output unit 113 outputs cryptographic information that represents the third encrypted polynomial (Step 202).

Such a cryptographic processing device 101 permits preventing of a leakage of a vector element when the cryptographic information generated by a cryptographic multiplication of vectors is decrypted.

FIG. 3 is a block diagram of an example of a biometric system that includes the cryptographic processing device 101 in FIG. 1. The biometric system in FIG. 3 includes the cryptographic processing device 101, a terminal 301-1, a terminal 301-2, and an authentication device 302, and performs an operation in a registration mode and an operation in an authentication mode. The cryptographic processing device 101 is connected to the terminal 301-1, the terminal 301-2, and the authentication device 302 via a communication network.

The terminal 301-1 and the terminal 301-2 encrypt biometric information and send it to the cryptographic processing device 101, and are, for example, a device of a user who knows a vector that represents the biometric information and a public key.

The cryptographic processing device 101 performs a cryptographic operation using encrypted vectors and sends a result of the cryptographic operation to the authentication device 302, and is, for example, a device of a service provider who knows a public key. The authentication device 302 performs authentication by decrypting the result of the cryptographic operation, and is, for example, a device of a decryptor who knows a secret key.

FIG. 4 is a block diagram of an example of processing performed by the biometric system in FIG. 3. In a registration mode, the terminal 301-1 obtains biometric information on a registrant by a sensor, transforms the characteristic information extracted from the biometric information into a vector A as described in Formula (21), and performs encryption 401-1. As biometric information obtained by a sensor, image information such as a fingerprint, a face, a vein, and an iris, and phonetic information such as a voice can be used.

In the encryption 401-1, the terminal 301-1 transforms the vector A into a polynomial pm1(A) as described in Formula (23), and encrypts the polynomial pm1(A) using a homomorphic encryption so as to generate an encrypted polynomial E1(A). Then, the terminal 301-1 sends cryptographic information that represents the encrypted polynomial E1(A) to the cryptographic processing device 101, and the cryptographic processing device 101 stores the cryptographic information received from the terminal 301-1 in the storage 111 as registered cryptographic information 311. As cryptographic information that represents an encrypted polynomial, for example, a coefficient included in each term of the encrypted polynomial can be used.

In an authentication mode, the terminal 301-2 obtains biometric information on a target to be authenticated, transforms characteristic information extracted from the biometric information into a vector B as described in Formula (22), and performs encryption 401-2. In the encryption 401-2, the terminal 301-2 transforms the vector B into a polynomial pm2(B) as described in Formula (24), and encrypts the polynomial pm2(B) using a homomorphic encryption so as to generate an encrypted polynomial E2(B). Then, the terminal 301-2 sends cryptographic information that represents the encrypted polynomial E2(B) to the cryptographic processing device 101.

The cryptographic processing device 101 performs a cryptographic operation 402 by use of the encrypted polynomial E1(A) represented by the registered cryptographic information 311 and the encrypted polynomial E2(B) represented by the cryptographic information received from the terminal 301-1, and performs cryptographic masking 403 on a result of the cryptographic operation 402. Then, the cryptographic processing device 101 sends the cryptographic information generated by the cryptographic masking 403 to the authentication device 302.

The authentication device 302 performs decryption 404 that decrypts the cryptographic information received from the cryptographic processing device 101 by use of a secret key, so as to generate a result of an operation of the vector A and the vector B. Then, the authentication device 302 authenticates the target to be authenticated on the basis of the generated result of the operation, and outputs an authentication result.

The result of the operation of the vector A and the vector B may be an inner product of the vector A and the vector B, or may be a similarity based on the inner product (such as cosine similarity), or may be a dissimilarity based on the inner product (such as a Hamming distance and an Euclidean distance).

For example, when the result of the operation is a similarity based on the inner product of the vector A and the vector B, the authentication device 302 can determine whether authentication has been successful by comparing the similarity to a threshold. In this case, it is determined that the authentication of the target to be authenticated has been successful when the similarity is greater than the threshold, and it is determined that the authentication has been unsuccessful when the similarity is not greater than the threshold.

When the result of the operation is a dissimilarity based on the inner product of the vector A and the vector B, the authentication device 302 can determine whether authentication has been successful by comparing the dissimilarity to the threshold. In this case, it is determined that the authentication of the target to be authenticated has been successful when the dissimilarity is less than the threshold, and it is determined that the authentication has been unsuccessful when the dissimilarity is not less than the threshold.

FIG. 5 is a flowchart of a specific example of cryptographic processing performed by the generator 112 in the cryptographic processing device 101. First, the generator 112 performs a cryptographic operation that corresponds to a result of an operation of the vector A and the vector B, so as to generate a result of the cryptographic operation E(L) (Step 501).

The result of the operation of the vector A and the vector B includes an inner product of the vector A and the vector B. This result of the operation may be the inner product of the vector A and the vector B, may be a sum of the inner product and another value, or may be a Hamming distance HD. A polynomial L that corresponds to the result of the cryptographic operation E(L) may be a polynomial D that corresponds to E(D) in Formula (27), or may be a polynomial $D_H$ that corresponds to $E(D_H)$ in Formula (28)

Next, the generator 112 performs cryptographic masking on the result of the cryptographic operation E(L) so as to mask, by random numbers, coefficients in one or more terms included in the polynomial L other than the term having a coefficient that represents the result of the operation of the vector A and the vector B (Step 502). Vector elements are less likely to be leaked by a decryption result if there are more masked coefficients.

FIG. 6 is a flowchart of an example of cryptographic masking performed at Step 502 in FIG. 5. First, the generator 112 compares n with 2d by use of the dimension d of the vector A and the vector B and a lattice dimension n of a homomorphic encryption (Step 601).

The polynomial pm1(A) is a polynomial of degree d−1 and the polynomial pm2(B) is a polynomial of degree d, so the degree of the polynomial L is at most 2d−1. Further, when n is less than 2d, the degree of the polynomial L is at most n−1 if $x^n = -1$ is used.

Then, when n is less than 2d (Step 601, YES), the generator 112 sets n as a variable N that represents the number of random numbers (Step 602), and when n is not less than 2d (Step 601, NO), the generator 112 sets 2d as a variable N (Step 603).

Next, in the polynomial L, d+1 mod n is set as a variable M that indicates a term $x^{M-1}$ having a coefficient that represents the result of the operation of the vector A and the vector B (Step 604), so as to generate an n-dimensional random vector R like the following formula (Step 605):

$$R = (r_1, r_2, r_3, \ldots, r_N) \tag{41}$$

$r_1$ to $r_{M-1}$ and $r_{M+1}$ to $r_N$ in Formula (41) are random numbers, and $r_M$ is a constant 0.

Next, the generator 112 transforms the random vector R into a mask polynomial pm(R) like the following formula by an ascending-order transformation that is similar to Formula (23) (Step 606).

$$pm(R) = r_1 + r_2 x + r_3 x^2 + \ldots + r_{M-1} x^{M-2} + r_{M+1} x^M + \ldots r_N x^{N-1} \tag{42}$$

The mask polynomial pm(R) is a polynomial of degree N−1 in which only a coefficient in the term $x^{M-1}$ is 0. For example, when n is not less than 2d, N=2d and M=d+1, and a result of the operation of the vector A and the vector B appears in the term $x^d$ in the polynomial L, with the result that $r_{d+1}$ becomes 0. On the other hand, when n is less than 2d, N=d and M=d+1 mod n. In particular, N=d=n and M=1 when n=d, and the result of the operation of the vector A and the vector B does not appear in the term $x^d$ but in the term $x^0$ (constant term) in the polynomial L, so the constant term $r_1$ in the mask polynomial pm(R) becomes 0.

The generator 112 encrypts the mask polynomial pm(R) by a homomorphic encryption so as to generate an encrypted mask polynomial E(pm(R)).

Next, the generator 112 adds the encrypted mask polynomial E(pm(R)) to the result of the cryptographic operation E(L), so as to generate an encrypted polynomial E(L') that corresponds to an encrypted result in which the coefficients in the terms other than the term $x^{M-1}$ in the polynomial L are masked (Step 607).

$$E(L') = E(L) + E(pm(R)) \tag{43}$$

Then, the output unit 113 sends cryptographic information that represents the encrypted polynomial E(L') to the authentication device 302.

The cryptographic operation at Step 501 in FIG. 5 can also be performed by a device other than the cryptographic processing device 101. For example, in this case, a device operated by another service provider may generate a result of the cryptographic operation E(L) by use of the encrypted polynomial E1(A) and the encrypted polynomial E2(B) and send it to the cryptographic processing device 101. The cryptographic processing device 101 performs the cryptographic masking at Step 502 on the received result of the cryptographic operation E(L).

FIG. 7 is a flowchart of an example of authentication processing performed by the authentication device 302. First, the authentication device 302 generates a polynomial L' by performing decryption 404 (Step 701). Next, the authentication device 302 obtains the value of M by performing a process similar to Step 604 in FIG. 6 (Step 702), and obtains a result of the operation of the vector A and the vector B from the coefficient in the term $x^{M-1}$ in the polynomial L' (Step 703).

Then, the authentication device 302 determines whether authentication has been successful by comparing the obtained result of the operation to a threshold, and outputs an authentication result about the target to be authenticated (Step 704).

According to the cryptographic masking in FIG. 6, the result of the operation which the authentication device 302 wants to know remains as the coefficient in the term $x^{M-1}$ in the polynomial L' but a random number $r_{i+1}$ is added to the coefficients in the other terms $x^i$ (i≠M−1). Thus, none of the information on the vector A and vector B except for the result of the operation which the authentication device 302 wants to know is ever leaked to the authentication device 302.

The vector A and the vector B are vectors based on biometric information on a user, so it may be highly confidential. Further, a person who knows the vector A is able to be successful in authenticating by accessing the cryptographic processing device 101 spoofing a registrant who has registered the encrypted polynomial E1(A). Thus, it is important to secure the information on the vector A and the vector B in the biometric system. It is possible to effectively secure the information on the vector A and the vector B by performing cryptographic masking on the result of the cryptographic operation E(L).

Further, it is also possible to shift a degree M−1 of a term that is not masked in the polynomial L by an integer k not less than 1 using k as the number of shifts. For example, in the encryption 401-1 in FIG. 4, if the terminal 301-1 shifts the degree d−1 of the polynomial pm1(A) by k, it is possible to shift by k the degree M−1 in the term in which a result of an operation appears in the polynomial L. In this case, the terminal 301-1, the cryptographic processing device 101, and the authentication device 302 store therein a value of k.

FIG. 8 is a flowchart of an example of encryption for shifting a degree of a polynomial pm1(A). First, the terminal 301-1 transforms the vector A into a polynomial pm1(A) (Step 801), and generates a polynomial pm1'(A) by multiplying the polynomial pm1(A) by $x^k$ (Step 802).

$$pm1'(A) = pm1(A) * x^k \quad (51)$$
$$= a_1 x^k + a_2 x^{k+1} + a_3 x^{k+2} + \cdots + a_d x^{k+d-1}$$

The operation of multiplying the polynomial pm1(A) by $x^k$ can be considered a shift operation (rotation operation).

Next, the terminal 301-1 encrypts the polynomial pm1'(A) by a homomorphic encryption so as to generate an encrypted polynomial E(pm1'(A)) (Step 803). Then, the terminal 301-1 generates cryptographic information using the encrypted polynomial E(pm1'(A)) as an encrypted polynomial E1(A), and sends the generated cryptographic information to the cryptographic processing device 101.

On the other hand, the terminal 301-2 generates an encrypted polynomial E2(B) without shifting a degree of a polynomial pm2(B) in the encryption 401-2.

The cryptographic processing device 101 performs the cryptographic operation 402 by use of the encrypted polynomial E1(A) and the encrypted polynomial E2(B) so as to generate a result of the cryptographic operation E(L). In this case, the generator 112 performs the cryptographic operation 402 so that the degree of the term in which a result of the operation of the vector A and the vector B appears in the polynomial L is shifted by k. For example, when the polynomial L corresponds to a polynomial D of an inner product, the generator 112 generates a result of the cryptographic operation E(D) by Formula (27).

On the other hand, when the polynomial L corresponds to a polynomial $D_H$ of a Hamming distance, the generator 112 generates a polynomial pm1'(C) by multiplying a polynomial pm1(C) by $x^k$.

$$pm1'(C) = pm1(C) * x^k \quad (52)$$
$$= (1 + x + x^2 + \cdots + x^{d-1}) * x^k$$
$$= x^k + x^{k+1} + x^{k+2} + \cdots + x^{k+d-1}$$

Then, the generator 112 generates an encrypted polynomial E(pm1'(C)) and generates a result of the cryptographic operation $E(D_H)$ by Formula (28) using the encrypted polynomial E(pm1'(C)) as an encrypted polynomial E1(C).

Figure 9:
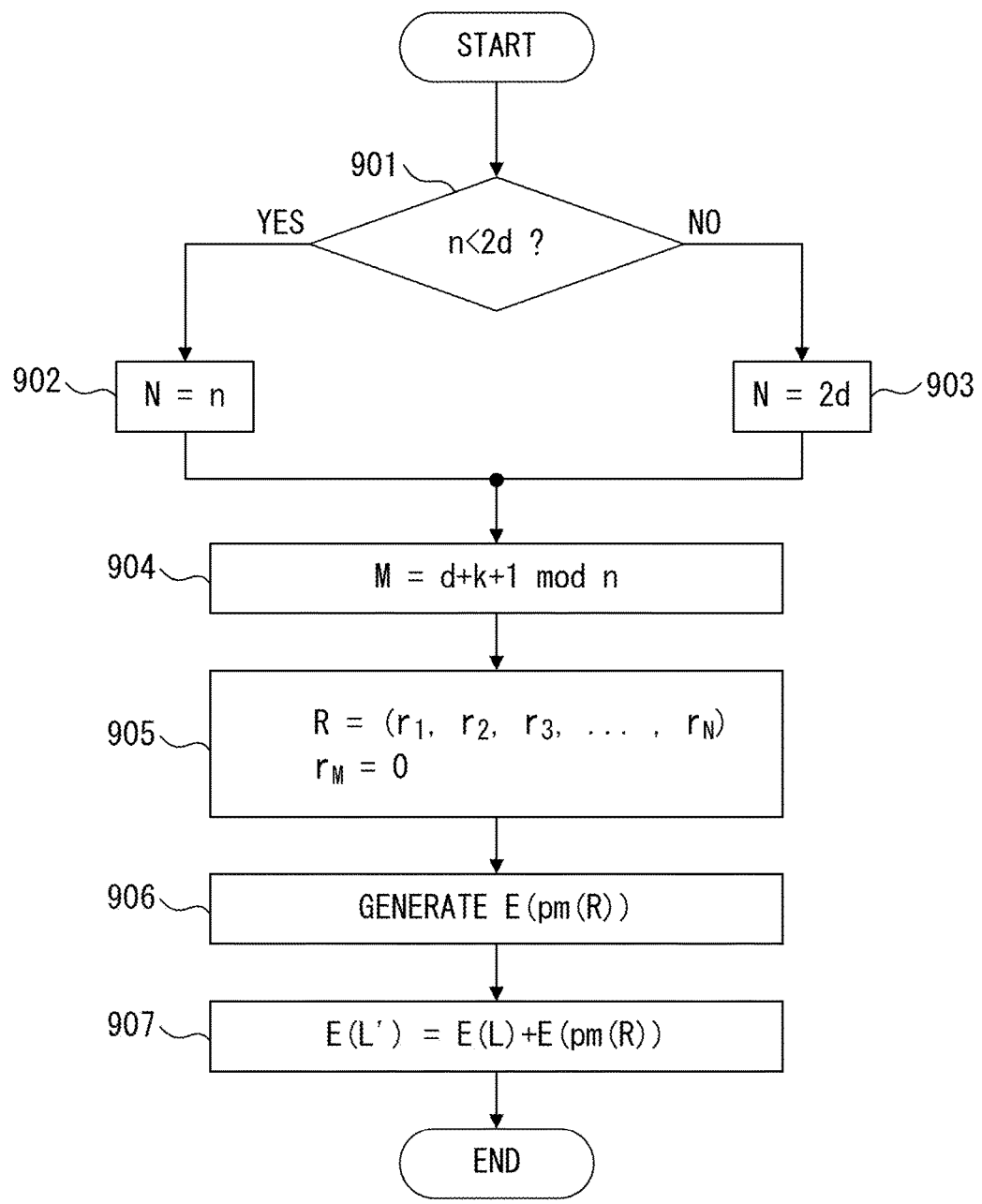
FIG. 9 is a flowchart of cryptographic masking based on a shift operation.

FIG. 9 is a flowchart of an example of cryptographic masking based on a shift operation. The cryptographic processing device 101 performs cryptographic masking of FIG. 9 at Step 502 of FIG. 5. The processes at Steps 901 to 903 and Steps 905 to 907 in FIG. 9 are similar to the processes at Steps 601 to 603 and Steps 605 to 607 in FIG. 6.

When the value of N has been set, the generator 112 sets d+k+1 mod n as a variable M which indicates the term $x^{M-1}$ in the polynomial L (Step 904), and performs the processes at and after Step 905.

Then, the output unit 113 sends to the authentication device 302 cryptographic information that represents the encrypted polynomial E(L'). Also, in the polynomial L', the degree of the term in which a result of the operation of the vector A and the vector B appears is shifted by k.

Figure 10:
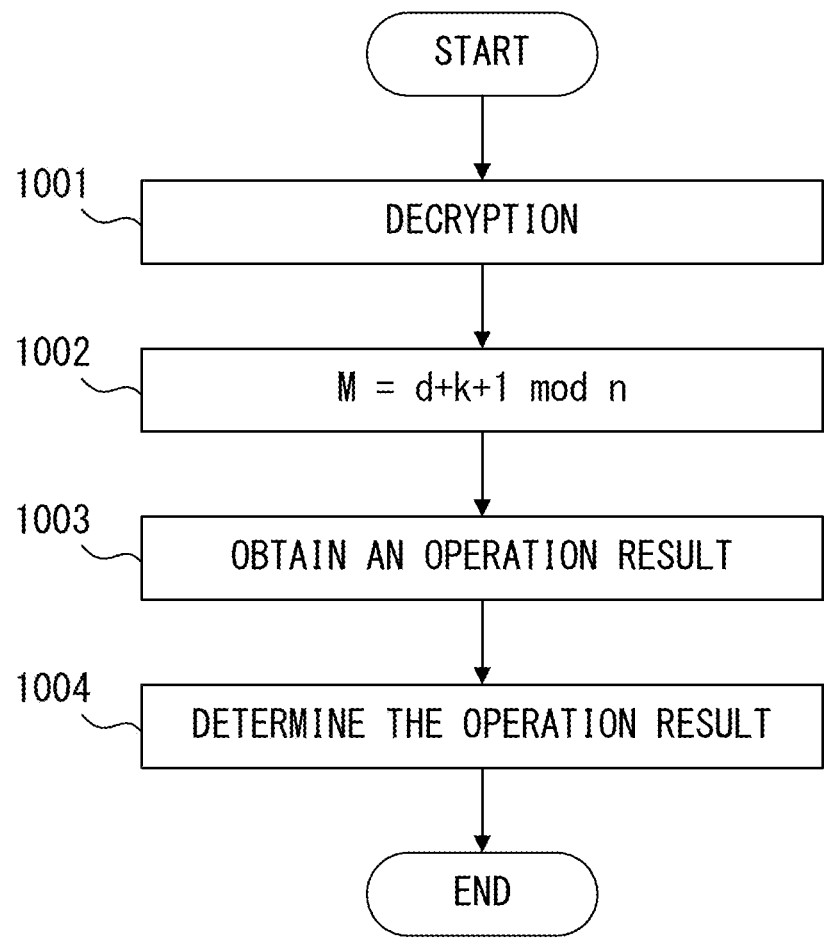
FIG. 10 is a flowchart of a first example of authentication processing based on a shift operation.

FIG. 10 is a flowchart of an example of authentication processing based on a shift operation. The processes at Steps 1001, 1003, and 1004 in FIG. 10 are similar to the processes at Steps 701, 703, and 704 in FIG. 7.

When the polynomial L' has been generated, the authentication device 302 obtains the value of M performing a process similar to Step 904 in FIG. 9 (Step 1002), and performs the processes at and after Step 1003.

FIG. 11 is a flowchart of another example of authentication processing based on a shift operation. The processes at Steps 1102 to 1105 in FIG. 11 are similar to the processes at Steps 701 to 704 in FIG. 7.

The authentication device 302 encrypts $x^{-k}$ using a homomorphic encryption so as to generate $E(x^{-k})$, and multiplies the encrypted polynomial E(L') by $E(x^{-k})$ (Step 1101). As a result, the degree of the term in which a result of the operation of the vector A and the vector B appears in the polynomial L is shifted by -k, and the effect of the shift operation performed by the terminal 301-1 is canceled. After that, the authentication device 302 performs the processes at and after Step 1102.

According to the shift operation described above, a cryptographic processing device that does not store therein a value of k does not perform proper cryptographic masking, and an authentication device that does not store therein the value of k does not perform proper authentication processing. Thus, when a cryptographic processing device or authentication device that does not store therein a value of k is involved, a correct result of an operation of the vector A and the vector B is not generated, which results in enhancing the confidentiality of the result of the operation.

In the encryption in FIG. 8, the polynomial pm1(A') may be generated after the vector A is transformed into a (d+k)-dimensional vector A' like the following formula instead of the polynomial pm1(A) being multiplied by $x^k$.

$$A' = (0, 0, \ldots, 0, a_1, a_2, a_3, \ldots, a_d) \quad (53)$$

The first to the kth elements of the vector A' in Formula (53) are 0, and the (k+1)th to the (k+d)th elements are $a_1$ to $a_d$. In this case, the polynomial pm1(A') is equivalent to the polynomial pm1'(A).

Further, instead of the terminal 301-1 shifting the degree d−1 of the polynomial pm1(A) by k, the terminal 301-2 may shift the degree d of the polynomial pm2(B) by k. As a result, the degree M−1 of the term in which the result of the operation appears in the polynomial L can be shifted by k.

In this case, the terminal 301-1 generates an encrypted polynomial E1(A) without shifting the degree of the polynomial pm1(A).

On the other hand, the terminal 301-2, the cryptographic processing device 101, and the authentication device 302 store therein a value of k, and the terminal 301-2 performs encryption as in FIG. 8. At Step 802 in FIG. 8, the terminal 301-2 generates a polynomial pm2'(B) by multiplying the polynomial pm2(B) by $x^k$.

$$pm2'(B) = pm2(B) * x^k \qquad (54)$$
$$= b_1 x^{k+d} + b_2 x^{k+d-1} + \cdots + b_d x^{k+1}$$

Then, the terminal 301-2 generates cryptographic information using an encrypted polynomial E(pm2'(B)) as an encrypted polynomial E2(B), and sends the generated cryptographic information to the cryptographic processing device 101.

When the polynomial L corresponds to a polynomial D of an inner product, the generator 112 of the cryptographic processing device 101 generates a result of the cryptographic operation E(D) by using Formula (27). On the other hand, when the polynomial L corresponds to a polynomial $D_H$ of a Hamming distance, the generator 112 generates a polynomial pm2'(C) by multiplying a polynomial pm2(C) by $x^k$.

$$pm2'(C) = pm2(C) * x^k \qquad (55)$$
$$= (x^d + x^{d-1} + \cdots + x) * x^k$$
$$= x^{k+d} + x^{k+d-1} + \cdots + x^{k+1}$$

Then, the generator 112 generates an encrypted polynomial E(pm2'(C)) and generates a result of the cryptographic operation $E(D_H)$ by using Formula (28) using the encrypted polynomial E(pm2'(C)) as an encrypted polynomial E2(C).

The cryptographic masking performed by the cryptographic processing device 101 is similar to that in FIG. 9, and the authentication processing performed by the authentication device 302 is similar to that in FIG. 10.

The polynomial pm2(B') may be generated after the vector B is transformed into a (d+k)-dimensional vector B' like the following formula instead of the polynomial pm2(B) being multiplied by $x^k$.

$$B' = (b_1, b_2, b_3, \ldots, b_d, 0, 0, \ldots, 0) \qquad (56)$$

The first to the dth elements of the vector B' in Formula (56) are $b_1$ to $b_d$, and the (d+1)th to the (d+k)th elements are 0. In this case, the polynomial pm2(B') is equivalent to the polynomial pm2' (B).

The operation of multiplying the polynomial pm1(A) or the polynomial pm2(B) by $x^k$ can also be performed on the encrypted polynomial E1(A) or the encrypted polynomial E2(B) in a state in which the polynomial remains encrypted. Thus, instead of the terminal 301-1 or the terminal 301-2, the cryptographic processing device 101 may multiply the encrypted polynomial E1(A) or the encrypted polynomial E2(B) by $E(x^k)$. Alternatively, the cryptographic processing device 101 may multiply a result of the cryptographic operation E (L) by E ($x^k$).

The processes at Steps 901 to 906 in FIG. 9 can also be performed by a device other than the cryptographic processing device 101. For example, if a device operated by another service provider generates an encrypted mask polynomial E(pm(R)) and sends it to the cryptographic processing device 101, the cryptographic processing device 101 can perform the process at Step 907 without having stored therein the value of k.

The process at Step 1101 in FIG. 11 can also be performed by a device other than the authentication device 302. For example, if a device operated by another service provider generates $E(x^{-k})$ and sends it to the authentication device 302, the authentication device 302 can perform the processes at Steps 1102 to 1105 without having stored therein a value of k.

The operation of shifting the degrees that are not to be masked in the polynomial L can also be performed in a plurality of steps, not at one time. For example, the terminal 301-1 may shift a degree d−1 of a polynomial pm1(A) by k1 and the cryptographic processing device 101 may shift a degree of a result of a cryptographic operation E(L) by k2 using k1 and k2 (k1 and k2 are integers not less than 1) that satisfy k=k1+k2. As a result, a degree M−1 of the term in which a result of the operation appears in the polynomial L can be shifted by k.

In this case, the terminal 301-1 stores therein the value of k1, and the cryptographic processing device 101 and the authentication device 302 store therein the values of k1 and k2.

FIG. 12 is a flowchart of an example of encryption for shifting a degree of a polynomial pmt (A) by k1. The processes at Steps 1201 to 1203 in FIG. 12 are similar to the processes at Steps 801 to 803 in FIG. 8 except that k has been replaced with k1.

FIG. 13 is a flowchart of an example of cryptographic processing for shifting a degree of a result of a cryptographic operation E(L) by k2. The cryptographic operation at Step 1301 in FIG. 13 is similar to the cryptographic operation at Step 501 in FIG. 5, and the cryptographic masking at Step 1303 is similar to the cryptographic masking in FIG. 9.

When the result of the cryptographic operation E(L) is generated, the generator 112 encrypts $x^{k2}$ by a homomorphic encryption so as to generate $E(x^{k2})$, and multiplies the result of the cryptographic operation E(L) by $E(x^{k2})$ (Step 1302). As a result, the degree of the result of the cryptographic operation E(L) is shifted by k2. After that, the generator 112 performs the cryptographic masking at Step 1303. The authentication processing performed by the authentication device 302 is similar to the processing in FIG. 10 or 11.

The shift operation at Step 1302 can also be performed after Step 1303. In this case, the generator 112 performs the cryptographic masking at Step 1303, replacing k with k1, and then multiplies the generated encrypted polynomial E(L') by $E(x^{k2})$.

Instead of the terminal 301-1 shifting the degree d−1 of the polynomial pm1(A) by k1, the terminal 301-2 may shift the degree d of the polynomial pm2(B) by k1.

As described above, various methods are considered for which device performs a shift operation and in how many steps the shift operation is performed. However, a shift operation and a mask operation can be combined in any of the methods.

The encrypted mask polynomial E(pm(R)) is generated depending on a public key pk, a dimension d of the vector A and the vector B, and the number of shifts k, and does not depend on the elements of the vector A and the vector B. Thus, for some applications, the encrypted mask polynomial E(pm(R)) can be generated before the vector A and the vector B are encrypted.

If the encrypted mask polynomial E(pm(R)) has been generated in advance, it is possible to reduce the time for cryptographic masking.

At Step 605 in FIG. 6 or Step 905 in FIG. 9, instead of 0, a random number may be used as an Mth element $r_M$ of a random vector R. In this case, the authentication device 302 can obtain a result of an operation of the vector A and the vector B by subtracting $r_M$ from the coefficient in the term $x^{M-1}$ in the polynomial L' if the value of $r_M$ is reported to the authentication device 302. On the other hand, if the value of $r_M$ has not been reported to the authentication device 302, it is difficult for the authentication device 302 to obtain the result of the operation of the vector A and the vector B from an encrypted polynomial E(L'). Thus, using a random number as $r_M$ permits a further enhancement of the confidentiality of the result of the operation.

The configurations of the cryptographic processing device 101 in FIG. 1 and the biometric system in FIG. 3 are merely examples and some of the components may be omitted or changed according to the applications or the requirements of the cryptographic processing device 101. For example, when a device other than the cryptographic processing device 101 performs a cryptographic operation in the biometric system in FIG. 3, the storage 111 that stores therein the registered cryptographic information 311 can be omitted.

In the biometric system in FIG. 3, the same terminal (the terminal 301-1 or the terminal 301-2) may perform the encryption 401-1 and the encryption 401-2. A plurality of users may perform the encryption 401-1, and a plurality of terminals 301-1 may be provided for the plurality of users. Likewise, the plurality of users may perform the encryption 401-2, and a plurality of terminals 301-2 may be provided for the plurality of users.

Further, the cryptographic processing device 101 in FIG. 1 is also applicable to a system other than a biometric system that uses a result of an operation including an inner product of the vector A and a vector B. For example, in a tag-search system for searching from among many tags a tag that has certain characteristics, the cryptographic processing device 101 may perform cryptographic processing for comparing feature vectors of two tags.

The flowcharts illustrated in FIGS. 2, and 5 to 13 are merely examples, and some of the processes may be omitted or changed according to the applications or the requirements of the cryptographic processing device 101 or the biometric system. For example, when a magnitude relationship between n and 2d has been set in advance, the processes at Steps 601 to 603 in FIG. 6 and Steps 901 to 903 in FIG. 9 can be omitted.

Further, in the cryptographic masking in FIGS. 6 and 9, not all the coefficients in the terms other than the term $x^{M-1}$ that are included in the polynomial L need to be masked. For example, when the information on the vector A or the vector B is less likely to be leaked from the coefficients in some of the terms in the polynomial L, the coefficients corresponding to these terms from among $r_1$ to $r_{M-1}$ and $r_{M+1}$ to $r_N$ in Formula (41) may be set to 0 at Steps 605 and 905.

Formulas (1) to (17), (21) to (31), (41) to (43), and (51) to (56) are merely examples, and other formulations may be used. For example, instead of the ascending-order transformation in Formula (23) being used for the vector A for a registrant and the descending-order transformation in Formula (24) being used for the vector B for a target to be authenticated, the ascending-order transformation may be used for the vector B and the descending-order transformation for the vector A.

The cryptographic processing device 101, the terminal 301-1, the terminal 301-2, and the authentication device 302 in FIGS. 1 and 3 can be implemented, for example, as a hardware circuit. In this case, each component in the cryptographic processing device 101 may be implemented as an individual circuit or a plurality of components may be implemented as an integrated circuit.

The cryptographic processing device 101, the terminal 301-1, the terminal 301-2, and the authentication device 302 can also be realized by using an information processing device (computer) as illustrated in FIG. 14.

The information processing device in FIG. 14 includes a central processing unit (CPU) 1401, a memory 1402, an input device 1403, an output device 1404, an auxiliary storage 1405, a medium driving device 1406, and a network connecting device 1407. These components are connected to one another via a bus 1408.

The memory 1402 is, for example, a semiconductor memory such as a read only memory (ROM), a random access memory (RAM), and a flash memory. The memory 1402 stores therein a program and data used for processing performed by the cryptographic processing device 101, the terminal 301-1, the terminal 301-2, or the authentication device 302. The memory 1402 can be used as the storage 111.

When the information processing device is the cryptographic processing device 101, the CPU 1401 (processor) operates as the generator 112 to perform cryptographic processing by executing the program by use of the memory 1402.

When the information processing device is the terminal 301-1, the terminal 301-2, or the authentication device 302, the CPU 1401 performs the processing to be performed by the terminal 301-1, the terminal 301-2, or the authentication device 302 by executing the program by use of the memory 1402.

The input device 1403 is, for example, a keyboard or a pointing device, and is used for inputting instructions or information from a user or an operator. The output device 1404 is, for example, a display, a printer, or a speaker, and is used for outputting inquiries to the user or the operator, or a result of processing. The result of processing may be a determination result of the authentication processing performed by the authentication device 302.

The auxiliary storage 1405 is, for example, a magnetic disk device, an optical disk device, a magneto-optical disk device, or a tape device. The auxiliary storage 1405 may be a hard disk drive or a flash memory. The information processing device stores the program and the data in the auxiliary storage 1405 so as to load them into the memory 1402 and use them. The auxiliary storage 1405 can be used as the storage 111.

The medium driving device 1406 drives a portable recording medium 1409 so as to access the recorded content. The portable recording medium 1409 is, for example, a memory device, a flexible disk, an optical disc, or a magneto-optical disk. The portable recording medium 1409 may be, for example, a compact disk read only memory (CD-ROM), a digital versatile disk (DVD), or a universal serial bus (USB) memory. The operator or the user can store the program and the data in the portable recording medium 1409 so as to load them into the memory 1402 and use them.

As described above, a computer-readable recording medium that stores therein a program and data is a physical (non-transitory) recording medium such as the memory 1402, the auxiliary storage 1405, and the portable storage medium 1409.

The network connecting device 1407 is a communication interface that is connected to a communication network such as a local area network (LAN) or the Internet and makes a data conversion associated with communication. The information processing device can receive the program and the data from an external device via the network connecting device 1407 so as to load them into the memory 1402 and use them. The network connecting device 1407 can be used as the output unit 113.

The information processing device does not necessarily include all the components in FIG. 14, and some of the components can be omitted according to the applications or the requirements. For example, when the instructions or the information from the user or the operator is not to be input, the input device 1403 may be omitted, and when the inquiries to the user or the operator or the result of processing is not to be output, the output device 1404 may be omitted. When the information processing device does not access the portable recording medium 1409, the medium driving device 1406 may be omitted.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A cryptographic processing method comprising:
   generating a third encrypted polynomial that corresponds to a result of encrypting a third polynomial by a computer, by use of a result of multiplying a first encrypted polynomial obtained by encrypting a first polynomial that corresponds to a first vector by a second encrypted polynomial obtained by encrypting a second polynomial that corresponds to a second vector, the third polynomial including a first term that has a coefficient based on an inner product of the first vector and the second vector and a second term other than the first term, wherein the computer masks a coefficient of the second term by performing cryptographic masking on the result of multiplying the first encrypted polynomial by the second encrypted polynomial; and
   outputting cryptographic information that represents the third encrypted polynomial.

2. The cryptographic processing method according to claim 1, wherein
   coefficients in one or more terms including the second term from among a plurality of terms included in the third polynomial are masked by random numbers.

3. The cryptographic processing method according to claim 1, wherein
   the first encrypted polynomial and the second encrypted polynomial are generated by a homomorphic encryption of lattice dimension n, and by use of a dimension d of the first vector and an integer k not less than 0, a degree of the first term is represented by an integer one less than a remainder obtained by dividing d+k+1 by n.

4. The cryptographic processing method according to claim 3, wherein
   the computer sends the cryptographic information to a decryption device, the third polynomial corresponds to a result of decrypting the third encrypted polynomial, the integer k is an integer not less than 1, and the decryption device obtains the coefficient of the first term included in the third polynomial by use of the integer k, the lattice dimension n and the dimension d.

5. The cryptographic processing method according to claim 1, wherein
   the coefficient based on the inner product represents the dissimilarity or similarity between the first vector and the second vector.

6. A cryptographic processing device comprising:
   a memory; and
   a processor coupled to the memory and that generates a third encrypted polynomial that corresponds to a result of encrypting a third polynomial by use of a result of multiplying a first encrypted polynomial obtained by encrypting a first polynomial that corresponds to a first vector by a second encrypted polynomial obtained by encrypting a second polynomial that corresponds to a second vector, the third polynomial including a first term that has a coefficient based on an inner product of the first vector and the second vector and a second term other than the first term, wherein the processor masks a coefficient of the second term by performing cryptographic masking on the result of multiplying the first encrypted polynomial by the second encrypted polynomial; and
   a communication interface coupled to the memory and the processor and that outputs cryptographic information that represents the third encrypted polynomial.

7. The cryptographic processing device according to claim 6, wherein
   coefficients in one or more terms from among a plurality of terms included in the third polynomial are masked by random numbers.

8. The cryptographic processing device according to claim 6, wherein
   the first encrypted polynomial and the second encrypted polynomial are generated by a homomorphic encryption of lattice dimension n, and by use of a dimension d of the first vector and an integer k not less than 0, a degree of the first term is represented by an integer one less than a remainder obtained by dividing d+k+1 by n.

9. The cryptographic processing device according to claim 8, wherein
   the output interface sends the cryptographic information to a decryption device, the third polynomial corresponds to a result of decrypting the third encrypted polynomial, the integer k is an integer not less than 1, and the decryption device obtains the coefficient of the first term included in the third polynomial by use of the integer k, the lattice dimension n and the dimension d.

10. The cryptographic processing device according to claim 6, wherein
    the coefficient based on the inner product represents the dissimilarity or similarity between the first vector and the second vector.

11. A non-transitory computer-readable recording medium having stored therein a cryptographic processing program that causes a computer to execute a process comprising:
    generating a third encrypted polynomial that corresponds to a result of encrypting a third polynomial by use of a result of multiplying a first encrypted polynomial obtained by encrypting a first polynomial that corresponds to a first vector by a second encrypted polynomial obtained by encrypting a second polynomial that corresponds to a second vector, the third polynomial including a first term that has a coefficient based on an inner product of the first vector and the second vector and a second term other than the first term, wherein the computer masks a coefficient of the second term by performing cryptographic masking on the result of multiplying the first encrypted polynomial by the second encrypted polynomial; and outputting cryptographic information that represents the third encrypted polynomial.

12. The non-transitory computer-readable recording medium according to claim 11, wherein coefficients in one or more terms from among a plurality of terms included in the third polynomial are masked by random numbers.

13. The non-transitory computer-readable recording medium according to claim 11, wherein the first encrypted polynomial and the second encrypted polynomial are generated by a homomorphic encryption of lattice dimension n, and by use of a dimension d of the first vector and an integer k not less than 0, a degree of the first term is represented by an integer one less than a remainder obtained by dividing d+k+1 by n.

14. The non-transitory computer-readable recording medium according to claim 13, wherein the computer sends the cryptographic information to a decryption device, the third polynomial corresponds to a result of decrypting the third encrypted polynomial, the integer k is an integer not less than 1, and the decryption device obtains the coefficient of the first term included in the third polynomial by use of the integer k, the lattice dimension n and the dimension d.

15. The non-transitory computer-readable recording medium according to claim 11, wherein the coefficient based on the inner product represents the dissimilarity or similarity between the first vector and the second vector.

* * * * *